United States Patent
Liu et al.

(10) Patent No.: US 9,952,965 B2
(45) Date of Patent: Apr. 24, 2018

(54) TEST SELF-VERIFICATION WITH INTEGRATED TRANSPARENT SELF-DIAGNOSE

(71) Applicant: International Business Machines Corporation, Armonk, NY (US)

(72) Inventors: Su Liu, Austin, TX (US); Priya Paul, Austin, TX (US); Jun Su, Beijing (CN); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 14/819,518

(22) Filed: Aug. 6, 2015

(65) Prior Publication Data

US 2017/0039121 A1   Feb. 9, 2017

(51) Int. Cl.
G06F 9/44   (2006.01)
G06F 11/36   (2006.01)

(52) U.S. Cl.
CPC ...... *G06F 11/3684* (2013.01); *G06F 11/3624* (2013.01)

(58) Field of Classification Search
CPC .................................................. G06F 11/3684
USPC ........................................................ 717/124
See application file for complete search history.

(56) References Cited

U.S. PATENT DOCUMENTS

| | | | |
|---|---|---|---|
| 5,485,409 A | 1/1996 | Gupta et al. | |
| 5,768,592 A * | 6/1998 | Chang ................. | G06F 11/3466 427/240 |
| 6,760,898 B1 | 7/2004 | Sanchez et al. | |
| 7,752,501 B2 | 7/2010 | Bak | |
| 7,925,659 B2 | 4/2011 | Wefers et al. | |
| 8,131,796 B2 | 3/2012 | Barsness et al. | |
| 8,151,247 B2 | 4/2012 | Wefers | |
| 8,230,267 B2 | 7/2012 | Noller et al. | |

(Continued)

FOREIGN PATENT DOCUMENTS

EP   1680741 B1   5/2012

OTHER PUBLICATIONS

Chillarege, "Self-testing software probe system for failure detection and diagnosis," Proceedings of the 1994 conference of the Centre for Advanced Studies on Collaborative research, 1994, pp. 1-8.
TESTCOLLAB, "Easiest Test Case Management Tool," Test Case Management Software Tool & Test Case Management Jira, http://testcollab.com/, printed on Jul. 29, 2015, pp. 1-2.
Oracle, "About Testing Globalized Software," Bookshelf v8.11/8.2: About Testing Globalized Software, http://docs.oracle.com/cd/E14004_01/books/GlobDep/GlobDepLocalizing18.html, 2013, pp. 1-2.

(Continued)

*Primary Examiner* — James D Rutten
(74) *Attorney, Agent, or Firm* — Teddi E. Maranzano

(57) ABSTRACT

A method, program product, and computer system is provided for test case self-validating. A probe builder, instruments one or more source code modules with a test probe. The test probe placement is based on at least one criterion including: an application program interface (API), a component, a test case name, a product release, and a product feature. The probe builder registers the test probe in a probe database. The registered test probe has record in the probe database that includes a probe identifier, a probed command, a probed file name, a line number, the test case name, and a location of an executable binary containing the test probe. The probe builder compiles the instrumented source code modules into one or more binary executable modules. The test case generator creates a test case that includes at least one registered test probe. The test case validator validates the test case.

20 Claims, 3 Drawing Sheets

(56) References Cited

U.S. PATENT DOCUMENTS

| | | | |
|---|---|---|---|
| 8,365,147 B2 | 1/2013 | Grechanik et al. | |
| 8,370,798 B2 | 2/2013 | Broadfoot et al. | |
| 8,938,729 B2* | 1/2015 | Martin | G06F 11/3466 717/130 |
| 2006/0064676 A1* | 3/2006 | Chavan | G06F 11/3628 717/124 |
| 2007/0061140 A1 | 3/2007 | Li et al. | |
| 2011/0131553 A1* | 6/2011 | Singh | G06F 11/3688 717/129 |
| 2011/0283260 A1 | 11/2011 | Bucuvalas | |
| 2012/0047489 A1 | 2/2012 | Varadharajan | |
| 2012/0253728 A1* | 10/2012 | Chamas | G06F 11/2294 702/109 |
| 2013/0014084 A1 | 1/2013 | Sahibzada et al. | |
| 2013/0239092 A1* | 9/2013 | Wieczorek | G06F 11/368 717/126 |

OTHER PUBLICATIONS

IBM, "Using IBM Rational Functional Tester to automate testing of globalized applications," http://www.ibm.com/developerworks/rational/library/07/0925_mirchandani-ujjwal/, printed on Feb. 3, 2015, pp. 1-11.

Irislogic Inc, "Solutions," Custom Software Development Services | Irislogic.com, https://www.irislogic.com/globalizationtesting.php, printed on Jul. 29, 2015, p. 1/1.

Gala, "Localization Testing," Localization Testing | Globalization and Localization Association, http://www.gala-global.org/localization-testing, printed on Feb. 3, 2015, pp. 1-2.

Zhou et al, "Software-Based Failure Detection and Recovery in Programmable Network Interfaces," IEEE Transactions on Parallel and Distributed Systems, vol. 18, No. 11, Nov. 2007, pp. 1539-1550.

* cited by examiner

TEST SELF-VERIFICATION WITH INTEGRATED TRANSPARENT SELF-DIAGNOSE

FIELD OF THE INVENTION

This disclosure relates generally to the field of test case management, and more particularly to test self-verification.

BACKGROUND

Development Operations (DevOps) is a methodology that recognizes an increasing overlap between the software development and test functions. DevOps can be characterized by continuous deployment, delivery, and verification of software, along with agile software development. A portion of a product's suite of test cases may be included in DevOps planning to facilitate the software development function. The suite of test cases may be packaged with the software product and shipped to a customer for use as real-time diagnostics.

A test case is designed to verify that a software component or product feature conforms to the specification and design. An operating system or an enterprise software application may require thousands of test cases to adequately verify the functions, features, and options during testing of the different diagnostic testing levels, for example unit, component and system testing. The suite of tests used in validating an operating system or enterprise software application is continually changing as new test cases are added, updated, or removed to accommodate the new and modified features in each product release, i.e., version. Meanwhile, a simultaneous effort to revalidate, modify or remove obsolete test cases is ongoing in parallel to reflect the changes in product features and functions. Thus, test case management and validation (TCMV) is an important consideration in planning for quality control and self-diagnostic analysis.

SUMMARY

According to one embodiment, a method for test case self-validating is provided. The method provides a probe builder that instruments one or more source code modules with a test probe. Placement for the test probe is based on at least one criterion including: an application program interface (API), a component, a test case name, a product release, and a product feature. The probe builder registers the test probe in a probe database. The registered test probe has a corresponding record that includes: a probe identifier, a probed command, a probed file name, a line number, the test case name, and a location of an executable binary containing the test probe. The probe builder compiles the instrumented source code modules into one or more binary executable modules. The test case generator creates a test case. The test case includes at least one registered test probe. The test case validator validates the test case.

According to another embodiment, a computer program product for test case self-validating is provided. The computer program product includes a test case management and validation (TCMV) system embodied on a computer readable storage medium. The TCMV includes program instructions executable by a processor. The probe builder program instructions instrument one or more source code modules with a test probe. The placement for the test probe is based on at least one criterion including: an application program interface (API), a component, a test case name, a product release, and a product feature. The probe builder program instructions register the test probe in a probe database. The registered test probe has a corresponding record including: a probe identifier, a probed command, a probed file name, a line number, the test case name, and a location of an executable binary containing the test probe. The probe builder program instructions compile the instrumented source code modules into one or more binary executable modules. The test case generator program instructions create a test case. The test case includes at least one test probe. The test case validator program instructions validate the test case.

According to another embodiment, a computer system for test case self-validating is provided. The computer system provides one or more processors, one or more computer-readable storage devices, and a plurality of program instructions stored on at least one of the one or more storage devices for execution by at least one of the one or more processors. The probe builder program instructions instrument one or more source code modules with a test probe. The placement for the test probe is based on at least one criterion including: an application program interface (API), a component, a test case name, a product release, and a product feature. The probe builder program instructions register the test probe in a probe database. The registered test probe has a corresponding record including: a probe identifier, a probed command, a probed file name, a line number, the test case name, and a location of an executable binary containing the test probe. The probe builder program instructions compile the instrumented source code modules into one or more binary executable modules. The test case generator program instructions create a test case. The test case includes at least one test probe. The test case validator program instructions validate the test case.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of test case management, and more particularly to test self-verification. The following described exemplary embodiments provide a system, method and program product to provide enhanced revalidation of existing software test cases and validation of new software test cases, such that an effective pool of test cases is maintained.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
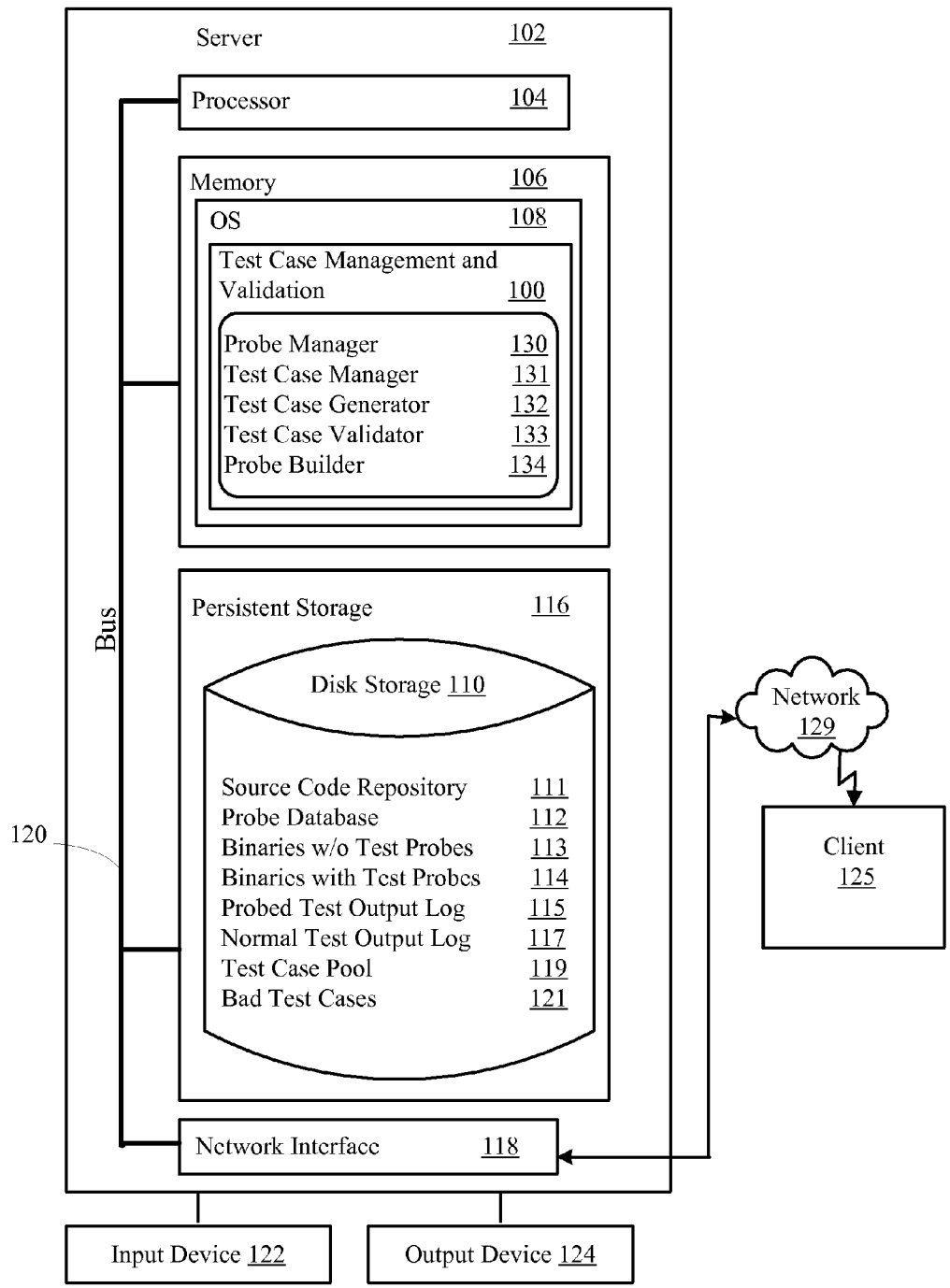
FIG. 1 illustrates an exemplary computer system environment operable for various embodiments of the disclosure.

FIG. 1 illustrates a block diagram of an exemplary data processing system operable for various embodiments of the disclosure. In this illustrative example, the data processing system includes a server 102 providing enhanced test case management and validation (TCMV) 100. The server 102 may be connected to other computers and servers via a network 129. The network 129 may include connections, such as wire, wireless communication links, or fiber optic cables.

The server 102 includes a processor unit 104 that executes instructions for software, for example the operating system (OS) 108 and TCMV 100 (discussed in further detail with respect to FIG. 2) that may be loaded into memory 106. The processor unit 104 may be a set of one or more processors or may be a multi-processor core, depending on the particular implementation. Further, the processor unit 104 is connected, via a bus 120, to memory 106, a network interface device 118, disk storage 110, persistent storage 116, and input device 122, and an output device 124.

The server 102 is generally under the control of an OS 108, such as Linux® (Linux is the registered trademark of Linus Torvalds in the United States, other countries, or both). However, any operating system supporting the functions disclosed herein may be used. The processor 104 is included to be representative of several implementation dependent architectures, such as a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the server 102 to communicate with other computers, including the client 125, via a network 129.

Persistent storage 116 may be any device or hardware that is capable of storing information, such as data, an OS 108, and program instructions, including those providing TCVM 100. Persistent storage 116 may take various forms depending on the particular implementation. For example, persistent storage 116 may be disk storage 110, a flash memory, optical disk, magnetic tape, cloud storage devices, or some combination of the above.

Instructions for the OS 108, TCMV 100, applications and/or programs may be located in persistent storage 116, which is in communication with processor unit 104 through the bus 120 fabric. In these illustrative examples the instructions are in a functional form on persistent storage 116. These instructions may be loaded into memory 106 for execution by processor unit 104.

The input device 122 may be any device for providing input to the server 102. For example, a keyboard and/or a mouse may be used. The output device 124 may be any device for providing output to a user of the server 102. Although shown separately from the input device 122, the output device 124 and input device 122 may be combined, as in a display screen with an integrated touch-screen.

As will be discussed with reference to FIG. 3, the server 102 and the computer hosting the client 125 may include internal components 800 and external components 900.

Figure 2:
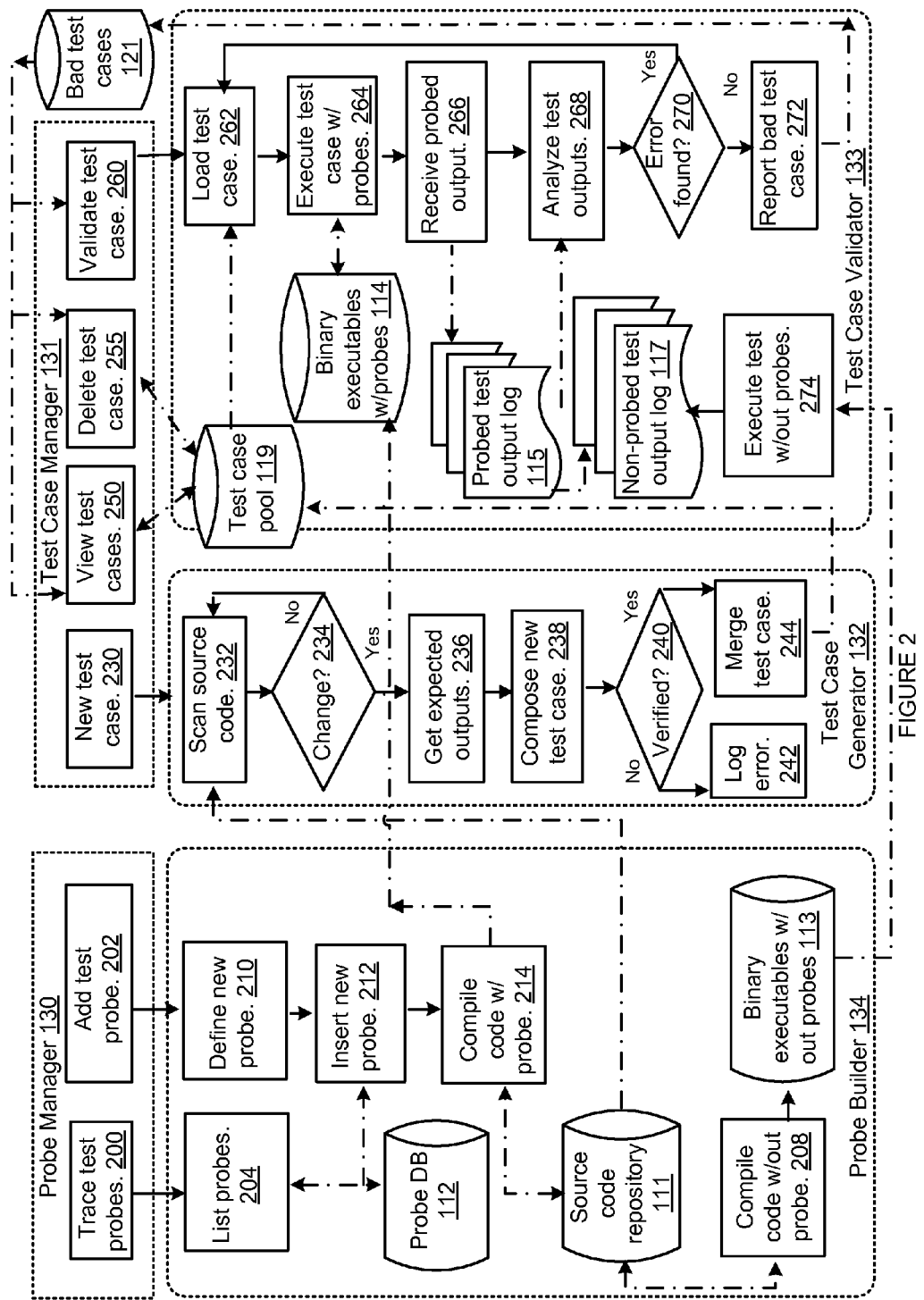
FIG. 2 illustrates components and algorithms associated with test case management and validation, according to various embodiments of the disclosure.

FIG. 2 illustrates components and algorithms associated with TCMV 100 (FIG. 1). The TCMV 100 (FIG. 1) provides a highly integrated test case management interface from which the team working on testing and quality assurance (QA) can access, validate, and manage the test case pool 119. Development Operations (DevOps) can be characterized by continuous and overlapping phases of deployment, delivery, and verification of software. In general, adding new test cases to test a new feature is easier than revalidating existing test cases, since re-validating existing test cases may require diverting a portion of the software development team's project schedule from actual development to collaborating with the test team to validate the test case pool on a case-by-case basis. However, overlooking test case revalidation can result in reduced product quality and diminished customer satisfaction.

For example, an enterprise software application may include several components, each of which have a defined set of expected behaviors, such as correctly displaying a message or performing a calculation. One or more test suites are created to verify each of the expected behaviors and to verify that the component still exhibits existing expected behaviors after the inclusion of new features. To ensure adequate coverage, suites of test cases may be directed to different diagnostic testing levels, for example unit, component, functional, and system testing. Some behaviors may not be verified. This may occur if a block of testing, such as functional verification, is either not performed or is only selective performed due to lack of time in the project schedule. Even if all test suites are performed, some behaviors still may not be verified if the existing test cases have not been validated as being accurate for the current release. Such test cases may verify a behavior that is no longer valid, but has not yet been identified as obsolete. This can occur where a product feature no longer exists, but the test case erroneously reports that the product feature passed validation. As a result, the likelihood that an end user will experience a software defect increases.

TCMV 100 (FIG. 1) includes a probe manager 130 and a test case manager 131. The probe manager 130 further provides functions for creating (add test probe 202) and testing probes (trace test probes 200), collectively referred to as the probe builder 134 component of the TCMV 100 (FIG. 1). An end-user may access the probe manager 130 from a client, such as client 125 (FIG. 1), using a command line or graphical user interface, for example.

In software testing, a probe, i.e., verification probe, is instrumentation built into pre-determined locations in source code, usually during design and coding. Probes are inserted in the software at locations where relevant information is needed to observe the behavior of the software during execution. The probe can be activated and deactivated, for example, by a profile setting such as a variable in the operating system environment, or through compiler directives.

The following example defines a probe (Step 210) for testing a component that uses globalized time formats using the setlocale function call. There may be several hundred instances of setlocale distributed across the several thousand source code files in the source code repository 111. The source code repository 111 can be indexed and organized such that source code elements including functions and variables can be easily located. For example, the probe manager 130 references the source code repository 111 to locate occurrences of setlocale to insert the new test probe into the probe database 112 at Step 212. The exemplary test probe shown in Table 1 can be enabled and disabled by compiler directives.

TABLE 1

Test Probe Using Compile Implementation

```
#ifndef __AIX2340444__SETLOCALE_PROBE
/* get what LC_TIME is set to */
        lc_time = setlocale(LC_TIME, 0);
#endif
```

Table 2 illustrates an alternate format for inserting a test probe into source code. This exemplary probe can be enabled and disabled depending on the setting of the SETLOCALE_PROBE environment variable.

TABLE 2

Test Probe Using Environment Variable Implementation

```
        /* get what LC_TIME is set to */
        if (!getenv("SETLOCALE_PROBE") {      /*<==
AIX2340444__SETLOCALE_PROBE*/
        lc_time = setlocale(LC_TIME, 0); /*disable test probe*/
        }
```

The probe database 112 records the test probe and related identifying information, such as the source code file, the lines within the file where the test probe exists, the related test cases that use the test probe, and the path and location where the compiled executable binary file exists, as in the following exemplary probe database record shown in Table 3:

TABLE 3

Probe Database Record

| | |
|---|---|
| Probe identifier: | AIX2340444 |
| Probed command and file name: | ls.c |
| Line number of the probe inserted: | ls.c:200 |
| Probed subroutine name: | lc_time = setlocale(LC_TIME, 0); |
| Related test case name: | FVT_ls_0001, FVT_ls_0002, FVT_ls_0003 |
| Path and location of executable binary code: | /path/location |

Therefore, the probe manager 130 in cooperation with the source code repository 111 automates the insertion or modification of test probes into the appropriate source code files.

At Step 214 the test probe is compiled with the source code from the source code repository 111. The resulting binary is stored in the database of binary executables with probes (probe-enabled) 114 for later use in validating test cases (validate test case 260). In addition to being used by the test case manager 131 for product testing, the probe-enabled binaries 114 may be packaged in a library that can be supplied to the customer for real-time problem diagnosis.

At Step 208, modules in the source code repository 111 are compiled without the test probes enabled. The resulting binary executables are stored in a database of binary executables without probes (non-probe enabled) 113. These non-probe enabled binaries 113 are input to the test case manager 131 for use in further product testing, and to validate test cases (validate test case 260).

The trace test probes 200 function of the test probe manager 130 provides the ability to list probes (Step 204) that are contained in the probe database 112. Individual test probes may be sorted or selected by several criteria, such as related test case name, probe identifier, probed subroutine, and file name. Tracing may be performed on any field that is registered in the probe database 112. Referring to the example in Table 3, for an enabled probe identifier AIX2340444, the trace test probes 200 function may determine validity of the related test cases FVT_ls_0001, FVT_ls_0002, and FVT_ls_0003 by tracing a sequence of executions as defined in the probe database 112 record, AIX2340444→ls.c→ls.c:200→lc_time=setlocale(LC_TIME, 0), as control passes through subroutines in FVT_ls_0001, FVT_ls_0002, and FVT_ls_0003.

The test case manager 131 component of the TCMV 100 (FIG. 1) provides a platform for test case operations, including viewing (view test cases 250), validating (validate test case 260), and deleting test cases (delete test case 255), collectively referred to as the test case validator 133. The test case generator 132 provides the function of adding a new test case 230. An end-user may access the test case manager 131 from a client, such as client 125 (FIG. 1), using a command line or graphical user interface, for example.

In this context, a test case is a set of scenarios that are applied to a software product, for example an operating system, enterprise application, or component thereof, to determine whether the software product is working according to its intended design. Executing a scenario in a test case may cause the execution of multiple software modules, each having one or more enabled test probes. The test case successfully completes based on the execution results matching the expected output.

The new test case 230 function of the test case manager 131 applies context analytics to determine whether a new test case should be generated. Context analytics denotes the incremental context accumulators that can detect like and related entities across a collection of data, including both current and historical data. The completeness of the data context enables analytics to correctly assess entities of interest. In one embodiment, at 232 the source code in the source code repository 111 corresponding to the current release is scanned and compared against source code corresponding to a previous release. In one embodiment, the test case generator 132 may be configured with a selection of search and comparison criteria, such as keywords, variables, functions calls, or application program interfaces (API). This approach may be applied to well-defined components. For example in an operating system, the interface to language globalization can include a finite number of APIs, such as those to set language locale, and to open, close, and retrieve messages from the message catalog. In another embodiment, an end-user may select keywords, APIs, or components to scan from a test case manager 131 menu. At 234, if a change is detected, such as a new or modified function in a searched component, the test case generator 132 processes the changes. Source code scanning continues if no changes are detected at 234. Changes may include added or modified messages, calculations, or variables. At 236 the test case generator 132 gets expected outputs. For example, in language globalization an expected output may include the format and length of an output message and its corresponding language locale, but not necessarily the text of the message. At 238 a new test case is composed for the new or modified feature, based on applied context analytics determining that new data is discovered for one or more entities.

In the portion of the exemplary test case in Table 4 in the language globalization component, a new flag is associated with a command to list files and directories. For each execution of the command, a variable is associated with a different language to direct the language globalization component to output the results localized for the specified language. At this stage of testing, globalized messages may be pseudo translated to ensure that messages in double byte character sets are not truncated on output, for example, but not necessarily display the actual message text. In pseudo translation, the original text is altered by techniques that are well-known in the field of language globalization.

TABLE 4

Globalization Test Case for lang in EN_US DE_DE ZH_CN KO_KR RU_RU
do
    echo "LANG=$lang"
    LANG=$lang ls -al ./tst_dir
done If at 240 the command output is displayed correctly for the specified language, the test case is verified. At 244, the verified test case is merged into the test case pool 119. If the test case is not verified, at 242 an error log entry is written with diagnostic details to facilitate debugging the test case.

In the view test cases 250 function, the test case validator 133 displays lists of available test cases from the test case pool 119 based on any number of criteria, such as component, release number, and test case name. An end-user may select a test case for a detailed view of its contents (view test cases 250), may delete the test case (delete test case 255), or may validate the test case (validate test case 260).

To validate test case 260, the test case validator 133 loads the test case (Step 262) from the test case pool 119. At 264 test case validator 133 loads the probe-enabled binaries 114 and executes the selected test case with test probes enabled. At 266 the probed execution output is gathered and written to a probed test output 115 log. The test case is executed again (Step 274) using the non-probe enabled binaries 113, and the execution output is gathered in the non-probed test output 117 log. At 268 the test case validator 133 analyzes the test outputs, either automatically or manually by an end-user, comparing the test case execution from the probed test output 115 log with the non-probed test output 117 log. If at 270 the outputs from the two executions are the same, then at 272 the test case is marked as defective and may be removed from the test case pool 119. The test case is added to the database of bad test cases 121 for further review. The test case may be viewed (view test cases 250), deleted (delete test case 255) or corrected and re-validated (validate test case 260). The test case may be defective, for example the portion of the test case shown in Table 4, where support for a language such as Chinese (i.e., locale ZH_CN) has been removed from a command, such the command to list files and directories (i.e., ls) but both the probed and non-probed execution returns the same results when the language variable is set to ZH_CN.

Figure 3:
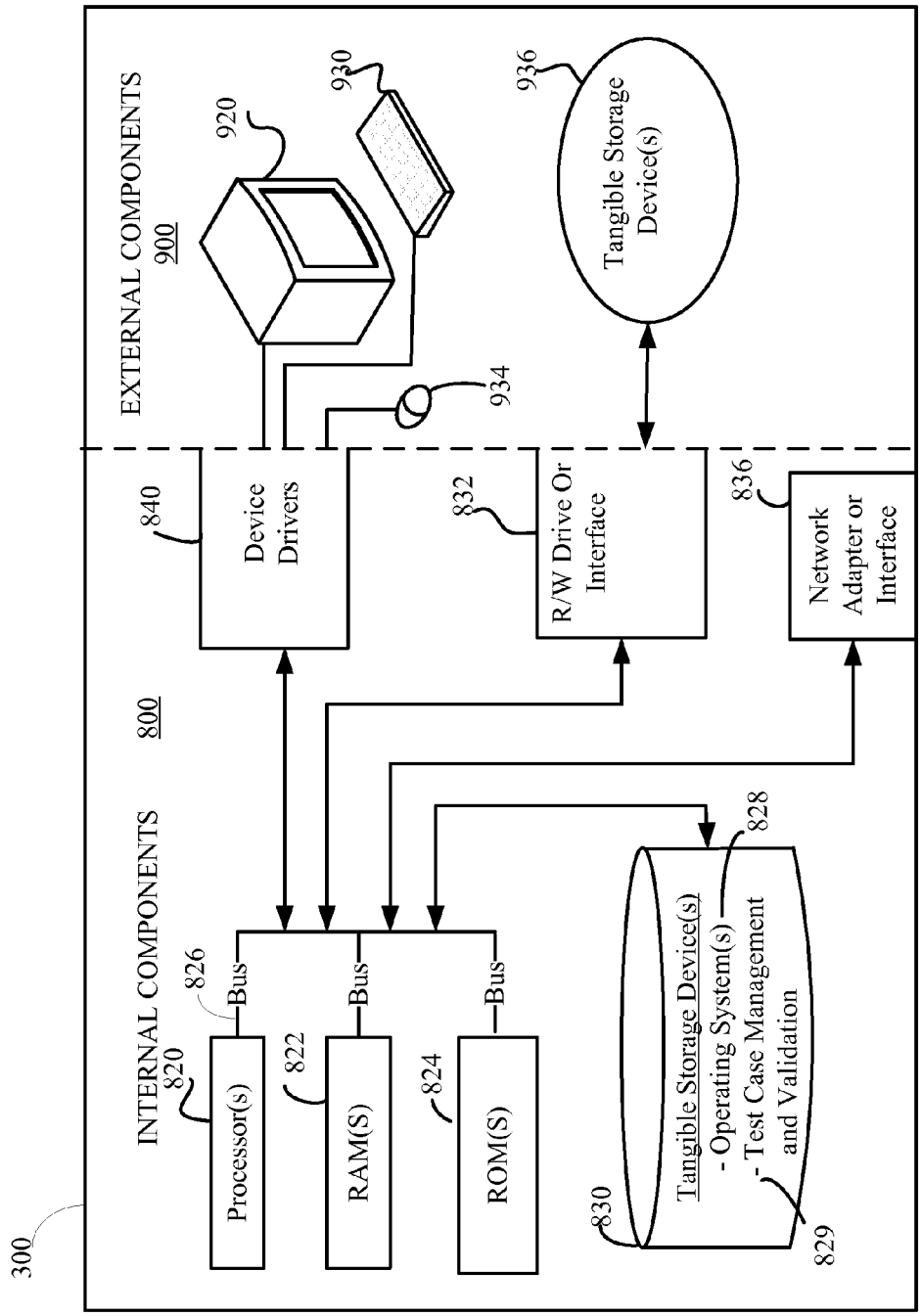
FIG. 3 is a schematic block diagram of hardware and software of the computer environment according to an embodiment of the process of FIG. 2.

FIG. 3 illustrates an exemplary computing device 300 applicable for executing the algorithm of FIG. 2. Computing device 300 may include respective sets of internal components 800 and external components 900 that together may provide an environment for a software application, such a test case management and validation (TCMV) system. Each of the sets of internal components 800 includes one or more processors 820; one or more computer-readable RAMs 822; one or more computer-readable ROMs 824 on one or more buses 826; one or more operating systems 828; one or more software applications (e.g., TCMV management 829) executing the method illustrated in FIG. 2; and one or more computer-readable tangible storage devices 830. The one or more operating systems 828 and test case management and validation system modules 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The time management modules 829, and operating system 828 that are associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for test case self-validating comprising:
    instrumenting, by a probe builder, one or more source code modules with a test probe wherein a placement for the test probe is based on at least one criterion including: an application program interface (API), a component, a test case name, a product release, and a product feature;
    registering, by the probe builder, the test probe in a probe database wherein the registered test probe has a corresponding record comprising: a probe identifier, a probed command, a probed file name, a line number, the test case name, and a location of an executable binary containing the test probe;
    compiling, by the probe builder, the instrumented source code modules into one or more binary executable modules;
    creating, by a test case generator, a test case wherein the test case includes at least one registered test probe; and
    validating, by a test case validator, the test case.

2. The method of claim 1, wherein compiling further comprises:
    enabling at least one test probe during the compiling and storing the one or more binary executable modules in a database of probe enabled binary executables; and
    compiling the instrumented source code modules without test probes enabled into one or more non-probe enabled binary executable modules and storing the one or more non-probe enabled binary executable modules in a database of non-probe enabled binary executables.

3. The method of claim 2, wherein validating the test case further comprises:
    performing a first execution of the test case using the database of non-probe enabled binary executables;
    performing a second execution of the test case using the database of probe enabled binary executables;
    marking the test case as invalid based on the first and the second execution returning the same results; and
    marking the test case as valid based on the first and the second executions returning different results.

4. The method of claim 2, wherein the database of probe enabled binary executables is packaged with a software product and provided as a library of real-time diagnostics.

5. The method of claim 1, wherein creating the test case further comprises:
    comparing a first source code repository corresponding to a current source code release and a second source code repository corresponding to a previous source code release wherein the comparing is based on at least one criterion including: the API, the component, the product release, and the product feature;
    getting an expected output based on a change present in the first source code repository; and
    verifying the test case; and
    merging the verified test case into a test case pool.

6. The method of claim 1, further comprising:
    selecting one or more probes from the probe database; and
    tracing an execution of one or more fields selected from the probe database record corresponding to the selected probes.

7. The method of claim 1, wherein the registered test probe is enabled or disabled in response to one of: a compiler directive, and a profile setting.

8. A computer program product for test case self-validating comprising:
    a test case management and validation (TCMV) system embodied on a computer readable storage medium, the TCMV including program instructions executable by a processor, the program instructions comprising:
    program instructions to instrument, by a probe builder, one or more source code modules with a test probe wherein a placement for the test probe is based on at least one criterion including: an application program interface (API), a component, a test case name, a product release, and a product feature;
    program instructions to register, by the probe builder, the test probe in a probe database wherein the registered test probe has a corresponding record comprising: a probe identifier, a probed command, a probed file name, a line number, the test case name, and a location of an executable binary containing the test probe;
    program instructions to compile, by the probe builder, the instrumented source code modules into one or more binary executable modules;
    program instructions to create, by a test case generator, a test case wherein the test case includes at least one test probe; and
    program instructions to validate, by a test case validator, the test case.

9. The computer program product of claim 8, wherein the program instructions to compile further comprise:
    program instructions to enable at least one test probe during the compiling and store the one or more binary executable modules in a database of probe enabled binary executables; and
    program instructions to compile the instrumented source code modules without test probes enabled into one or more non-probe enabled binary executable modules and store the one or more non-probe enabled binary executable modules in a database of non-probe enabled binary executables.

10. The computer program product of claim 9, wherein the program instructions to validate the test case further comprise:
    program instructions to perform a first execution of the test case using the database of non-probe enabled binary executables;
    program instructions to perform a second execution of the test case using the database of probe enabled binary executables;
    program instructions to mark the test case as invalid based on the first and the second execution returning the same results; and program instructions to mark the test case as valid based on the first and the second executions returning different results.

11. The computer program product of claim 9, wherein the database of probe enabled binary executables is packaged with a software product and provided as a library of real-time diagnostics; and wherein the registered test probe is enabled or disabled in response to one of: a compiler directive, and a profile setting.

12. The computer program product of claim 8, further comprising:
program instructions to select one or more probes from the probe database; and
program instructions to trace an execution of one or more fields selected from the probe database record corresponding to the selected probes.

13. The computer program product of claim 8, wherein the program instructions to create the test case further comprise:
program instructions to compare a first source code repository corresponding to a current source code release and a second source code repository corresponding to a previous source code release wherein the comparing is based on at least one criterion including: the API, the component, the product release, and the product feature;
program instructions to get an expected output based on a change present in the first source code repository; and
program instructions to merge the verified test case into a test case pool.

14. A computer system for test case self-validating comprising:
one or more processors, one or more computer-readable storage devices, and a plurality of program instructions stored on at least one of the one or more storage devices for execution by at least one of the one or more processors, the plurality of program instructions comprising:
program instructions to instrument, by a probe builder, one or more source code modules with a test probe wherein a placement for the test probe is based on at least one criterion including: an application program interface (API), a component, a test case name, a product release, and a product feature;
program instructions to register, by the probe builder, the test probe in a probe database wherein the registered test probe has a corresponding record comprising: a probe identifier, a probed command, a probed file name, a line number, the test case name, and a location of an executable binary containing the test probe;
program instructions to compile, by the probe builder, the instrumented source code modules into one or more binary executable modules;
program instructions to create, by a test case generator, a test case wherein the test case includes at least one registered test probe; and
program instructions to validate, by a test case validator, the test case.

15. The computer system of claim 14, wherein the program instructions to compile further comprise:
program instructions to enable at least one test probe during the compiling and store the one or more binary executable modules in a database of probe enabled binary executables; and
program instructions to compile the instrumented source code modules without test probes enabled into one or more non-probe enabled binary executable modules and store the one or more non-probe enabled binary executable modules in a database of non-probe enabled binary executables.

16. The computer system of claim 15, wherein the program instructions to validate the test case further comprise:
program instructions to perform a first execution of the test case using the database of non-probe enabled binary executables;
program instructions to perform a second execution of the test case using the database of probe enabled binary executables;
program instructions to mark the test case as invalid based on the first and the second execution returning the same results; and
program instructions to mark the test case as valid based on the first and the second executions returning different results.

17. The computer system of claim 15, wherein the database of probe enabled binary executables is packaged with a software product and provided as a library of real-time diagnostics.

18. The computer system of claim 14, further comprising:
program instructions to select one or more probes from the probe database; and
program instructions to trace an execution of one or more fields selected from the probe database record corresponding to the selected probes.

19. The computer system of claim 14, wherein the program instructions to create the test case further comprise:
program instructions to compare a first source code repository corresponding to a current source code release and a second source code repository corresponding to a previous source code release wherein the comparing is based on at least one criterion including: the API, the component, the product release, and the product feature;
program instructions to get an expected output based on a change present in the first source code repository; and
program instructions to merge the verified test case into a test case pool.

20. The computer system of claim 14, wherein the registered test probe is enabled or disabled in response to one of: a compiler directive, and a profile setting.

* * * * *